United States Patent
Sul et al.

(10) Patent No.: US 6,185,115 B1
(45) Date of Patent: Feb. 6, 2001

(54) THREE-PHASE PULSE WIDTH MODULATION METHOD AND SYSTEM FOR ALTERNATING CURRENT MOTOR

(76) Inventors: Seung Ki Sul, 1545-3, Sinlim-Dong, Kwanak-Ku; Hyeoun Dong Lee, Jangmi-villa 401, 975-18, Daechi 3-Dong, Kangnam-Ku, both of Seoul (KR)

(*) Notice: Under 35 U.S.C. 154(b), the term of this patent shall be extended for 0 days.

(21) Appl. No.: 09/354,715

(22) Filed: Jul. 16, 1999

(30) Foreign Application Priority Data

Nov. 17, 1998 (KR) .................................................. 98/49321

(51) Int. Cl.⁷ .................................................... H02M 5/45
(52) U.S. Cl. ............................................................ 363/37
(58) Field of Search .................................. 363/34, 35, 36, 363/37, 41, 97, 98, 131, 132; 318/801, 803, 811

(56) References Cited

U.S. PATENT DOCUMENTS

| | | | |
|---|---|---|---|
| 4,833,586 | * | 5/1989 | Inaba et al. ............................. 363/41 |
| 4,894,763 | * | 1/1990 | Ngo ........................................ 363/35 |
| 5,136,494 | * | 8/1992 | Akagi et al. ............................ 363/34 |
| 5,742,493 | * | 4/1998 | Ito et al. ................................. 363/37 |

* cited by examiner

*Primary Examiner*—Matthew Nguyen
(74) *Attorney, Agent, or Firm*—Oliff & Berridge, PLC

(57) ABSTRACT

A three-phase pulse width modulation method in a motor control system which drives a three-phase AC motor that determines a current switching pattern of a converter and then moves switching points of three phases of an inverter so that a switching point of a phase among the three-phases of the converter accords with a switching point of a phase among the three-phases of the inverter in accordance with the determined switching pattern, thereby reducing a voltage generated between the three-phase Ac motor and a ground, that is the size of the pulse number of a common-mode voltage.

11 Claims, 16 Drawing Sheets

THREE-PHASE PULSE WIDTH MODULATION METHOD AND SYSTEM FOR ALTERNATING CURRENT MOTOR

BACKGROUND OF THE INVENTION

1. Field of the Invention

The present invention relates to a method for modulating a three-phase pulse width in a motor control system, and more particularly to a three-phase pulse width modulation method and system that reduces a voltage generated between a three-phase alternating current AC motor and a ground, that is a common mode voltage.

2. Description of the Conventional Art

FIG. 1 is a diagram illustrating a three-phase pulse width modulation system for an AC motor in the conventional art.

As shown therein, a converter 1 converts a three-phase voltage to a direct current DC voltage and an inverter 2 receives the DC voltage through a couple of capacitors C1, C2 and modulates the received DC voltage to a three-phase pulse width system, the converter 1 and the inverter 2 consisting of six switching transistors T11–T16, T21–T26, respectively.

A control unit 4 outputs first pole voltage commands $S_U, S_V, S_W$ for switching the switching transistors T11–T16 of the converter 1 and outputs second pole voltage commands $S_A, S_B, S_C$ for switching the switching transistors T21–T26 of the inverter 2. A first driving unit 5 supplies driving signals D1–D6 to the switching transistors T11–T16, respectively, in accordance with the first pole voltage commands $S_U, S_V, S_W$, and a second driving unit 6 applies driving signals D7–D12 to the switching transistors T21–T26, respectively, in accordance with the second pole voltage commands $S_A, S_B, S_C$. For example, when the first pole voltage command $S_U$ is 1, the switching transistor T11 of the converter 1 is turned on and T14 is turned off, while if the second pole voltage command $S_A$ is 1, the switching transistor T21 of the inverter 2 is turned on and T24 is turned off.

Since the converter 1 and the inverter 2 are switched in accordance with the pole voltage commands of the control unit 4, a pattern of the three-phase pulse width modulation is determined by the pole voltage commands. Thus, how the pole voltage commands are outputted controls the three-phase pulse width modulation.

While, a voltage difference Vsg between a neutral point S of stator coils of an AC motor 3 and a ground is a common-mode voltage. Such a common-mode voltage causes many problems, which are mainly a leakage current flowing through a parasitic capacitor existing between the motor coils and a motor case, emission or conductive electrical interference, a shaft voltage and a bearing current, and dielectric breakdown of the motor due to an overvoltage. Damage caused by those problems has occurred in succession in the whole industrial world, and accordingly studies for reducing the common-mode voltage have been lively made.

With reference to FIGS. 2 and 3, there will be described the switching of the converter 1 and the inverter 2 in accordance with the pole voltage commands supplied from the control unit 4 and the relation between the switching of the converter 1 and the inverter 2 and the common-mode voltage.

Specifically, FIG. 2 is a vector diagram illustrating an output voltage vector of the converter and an output voltage vector of the inverter in the conventional art.

As shown therein, vectors V0–V7 are output voltage vectors of the converter or the inverter, each being determined by a value of the pole voltage command. A first digit of 100 in a vector V1 (100) indicates the pole voltage command $S_U$ or $S_A$, a second digit thereof indicates the pole voltage command $S_V$ or $S_B$, and a third digit thereof indicates the pole voltage command $S_W$ or $S_C$. In other words, the first digit, which is 1 of 100, means that the upper switching transistor T11 coupled with the phase U of the converter 1 is turned on and the lower switching transistor T14 is turned off, or the upper switching transistor T21 coupled with the phase A of the inverter 2 is turned on and the lower switching transistor T24 is turned off. Thus, the converter and the inverter have eight output voltage vectors, respectively, in accordance with logic levels of the pole voltage commands, wherein vectors V1–V6 which are effective voltage vectors control the motor 3 and the other two vectors V0,V7 which are zero voltage vectors indicate that no three-phase voltage is supplied to the motor 3, whereby the motor 3 is not affected thereby.

FIG. 3 is a wave-form diagram illustrating an output of each unit in FIG. 1 when performing a three-phase symmetrical space-vector pulse width modulation.

As shown therein, on-intervals $T_U, T_V, T_W$ of the first pole voltage commands $S_U, S_V, S_W$ indicate switching intervals of the phases U, V, W, respectively, of the converter 1 and on-intervals $T_A, T_B, T_C$ of the second pole voltage commands $S_A, S_B, S_C$ indicate switching intervals of the phases A, B, C, respectively, of the inverter 2. In addition, Vc and Vi indicate the output voltage vectors of the converter 1 and the inverter 2, respectively, and a portion with oblique lines indicates the effective voltage vector. Vsg, as described above, is the common-mode voltage. The effective voltage of the output voltage vector Vc of the converter 1 exists in an interval $T_U$–$T_W$ until the pole voltage command $S_W$ becomes turned on after the pole voltage command $S_U$ is turned on, while the effective voltage of the output voltage vector Vi of the inverter 2 exists in an interval TA–TC until the pole voltage command $S_C$ becomes turned on after the pole voltage command $S_A$ is turned on. The common-mode voltage Vsg is determined by the switching of the converter 1 and the inverter 2, the common-mode voltage Vsg, which exists during the interval in which the output voltage vector Vc of the converter 1 is the effective voltage, having six different changes during a control cycle Tz. The size of the common-mode voltage Vsg is ⅓ of a DC bus voltage Vdc which is a voltage between a connection point of condensers C1, C2 and a connection point of the two switching transistors of the inverter 2.

As described above, among the problems caused by the common-mode voltage, particularly many problems occur due to the pulse in accordance with the change of the common-mode voltage dVsq/dt, the pulse being generated at a point of time when the common-mode voltage Vsg varies.

To solve the above problems due to the common-mode voltage, there has been introduced a method that offsets the common-mode voltage by using a filter and a common-mode choke/transformer or additionally providing a leg to the three-phase pulse width modulation system of the conventional AC motor. However, to perform the above conventional method, a separate hardware must be additionally supplied, which results in increase in the weight and volume of the system and the manufacturing cost thereof, and the complication of the control, thereby leading to the deterioration of the system reliability. In addition, since the filter and common-mode transformer must be suitably designed to each application field, it is difficult to apply to the industrial circles.

SUMMARY OF THE INVENTION

Accordingly, the present invention is directed to a three-phase pulse width modulation method and system for an alternating current motor which obviates the problems and disadvantages in the conventional art.

An object of the present invention is to provide a three-phase pulse width modulation method and system for an alternating current motor that reduces a common-mode voltage generated during a switching operation and the pulse number thereof in consideration of switching of switching transistors of a converter without providing a separate hardware.

To achieve these and other advantages and in accordance with the purpose of the present invention, as embodied and broadly described herein, there is provided a three-phase pulse width modulation method and system for an alternating current motor that determines a current switching pattern of a converter and then moves switching points of three phases of an inverter so that a switching point of a phase among the three-phases of the converter accords with a switching point of a phase among the three-phases of the inverter in accordance with the determined switching pattern.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 3:
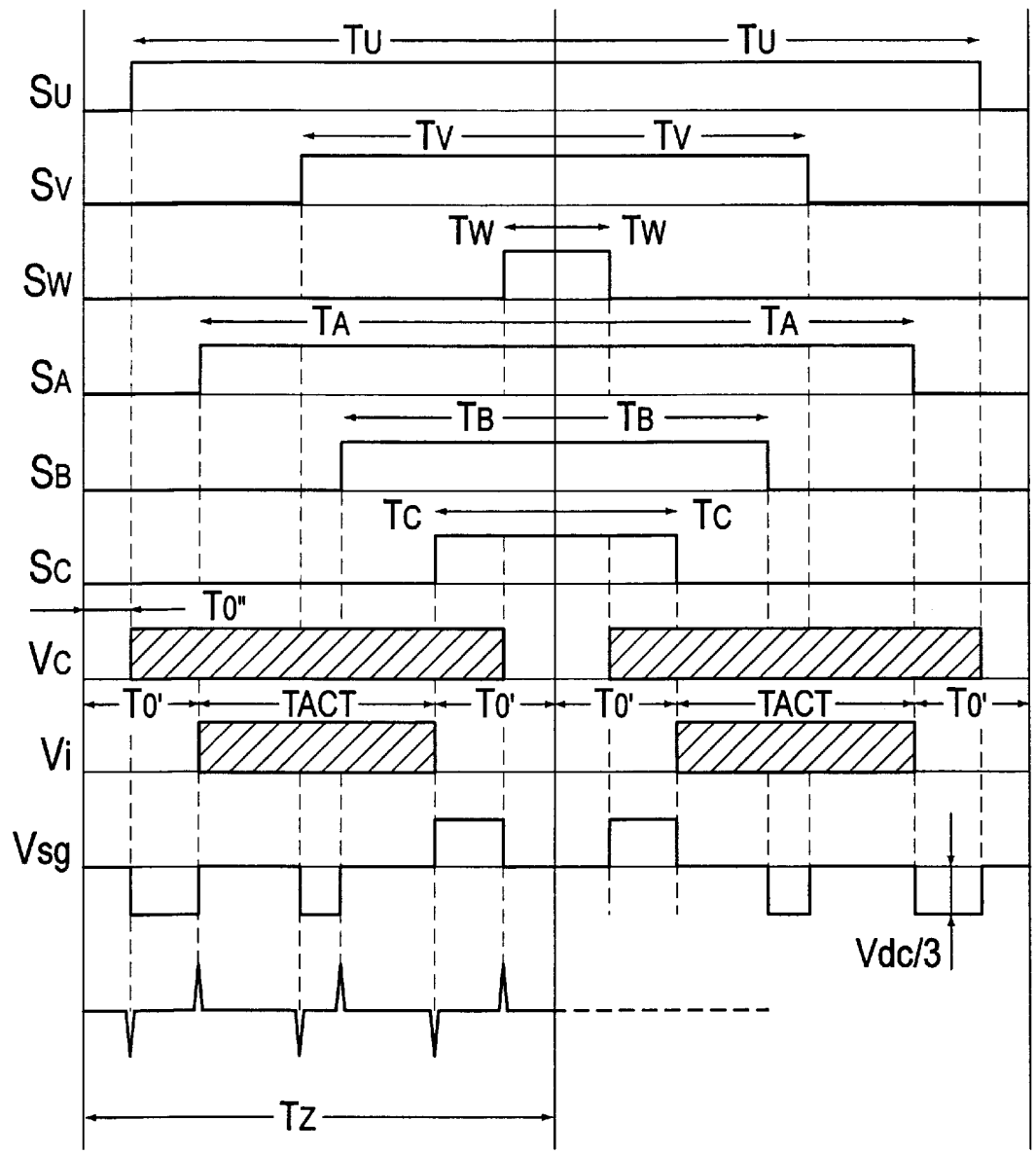
FIG. 3 is a wave-form diagram illustrating an output of each unit in the conventional art when performing a three-phase symmetrical space-vector pulse width modulation.

With reference to FIG. 3, the relation between the pole voltage command and the common-mode voltage Vsg will be described.

The common-mode voltage Vsg decreases by Vdc/3 at a point which the pole voltage commands $S_U, S_V, S_W$ respectively become a high level, and the common-mode voltage Vsg increases by Vdc/3 at a point which the pole voltage commands $S_A, S_B, S_C$ respectively become a high level. That is, the pole voltage commands $S_U, S_V, S_W$ reduce the common-mode voltage Vsg, while the pole voltage commands $S_A, S_B, S_C$ increase the common-mode voltage Vsg. Thus, since the common-mode voltage Vsg is determined by the pole voltage commands and the DC bus voltage Vdc, Vsg can be expressed in a following equation.

$$Vsg = \frac{Vdc}{3}[(S_A + S_B + S_C) - (S_U + S_V + S_W)]$$

For example, when the output voltage vector Vc of the converter is V1 (100) and when the output voltage vector Vi of the inverter is V2 (110), $S_U$ is 1, $S_V$ and $S_W$ are 0, $S_A$ and $S_B$ are 1 and $S_C$ is 0. When the above values are substituted for the equation, the result thereof is as follows.

$$Vsg = \frac{Vdc}{3}[(1+1+0)-(1+0+0)]$$

When considering all of the converter output voltage vectors Vc and the inverter output voltage vectors Vi, the common-mode voltage Vsg can be 0, ±Vdc/3, ±2Vdc/3, and ±Vdc as shown in the following table.

Thus, since the common-mode voltage Vsg is reduced by the pole voltage commands $S_U$, $S_V$, Sw and increased by the pole voltage commands $S_A, S_B, S_C$, the common-mode voltage has no change when the switching point of the converter accords with that of the inverter. That is, because the switching point of the converter corresponds to a level change point of each of the pole voltage commands $S_U, S_V, S_W$ and the switching point of the inverter corresponds to a level change point of each of the pole voltage commands $S_A, S_B, S_C$, the level change points of the pole voltage commands $S_A, S_B, S_C$ are changed to accord with the level change points of the pole voltage commands $S_U, S_V, S_W$ Thus, the change of the common-mode voltage is reduced by according the switching point of the converter to that of the inverter in consideration of the switching point of the converter.

| | Output voltage vectors of inverter | | | |
|---|---|---|---|---|
| | V1,V3,V5 | V2,V4,V5 | Vo | V7 |
| Output voltage vectors of Converter | V1,V3,V5 | 0 | Vdc/3 | −Vdc/3 | 2Vdc/3 |
| | V2,V4,V6 | −Vdc/3 | 0 | −2Vdc/3 | Vdc/3 |
| | Vo | Vdc/3 | 2Vdc/3 | 0 | Vdc |
| | V7 | −2Vdc/3 | −Vdc/3 | −Vdc | 0 |

In this case, an inverter effective voltage interval (a location of the effective voltage) can increase or decrease, and when the volume of the inverter effective voltage is changed, the motor control performance accordingly varies. Thus, the inverter switching point must be changed within a range wherein the volume of the inverter effective voltage does not change.

Figure 4:
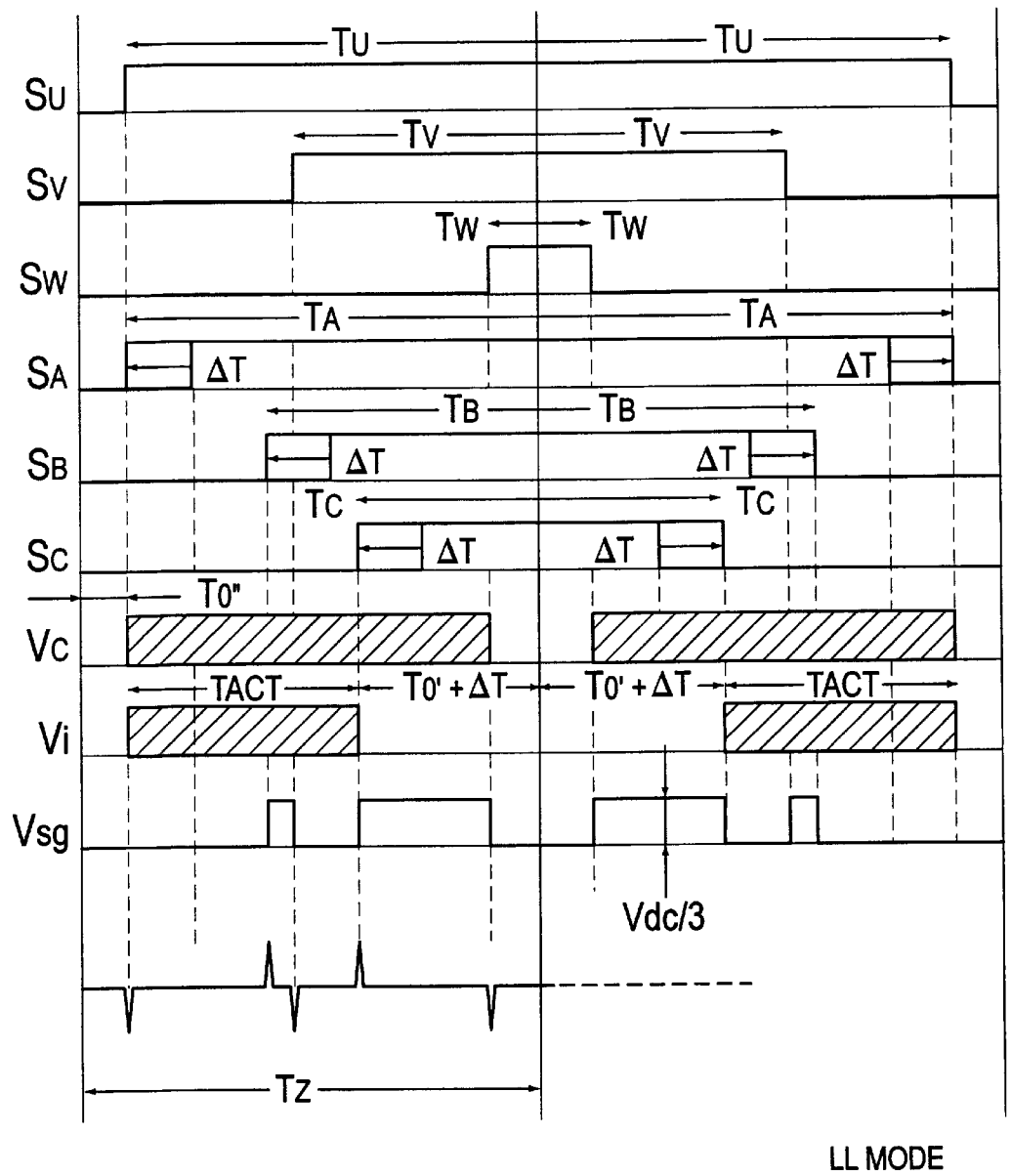
FIG. 4 is a wave-form diagram illustrating an output of each unit when performing a three-phase symmetrical space-vector pulse width modulation in an LL mode according to a first embodiment of the present invention.
Figure 5:
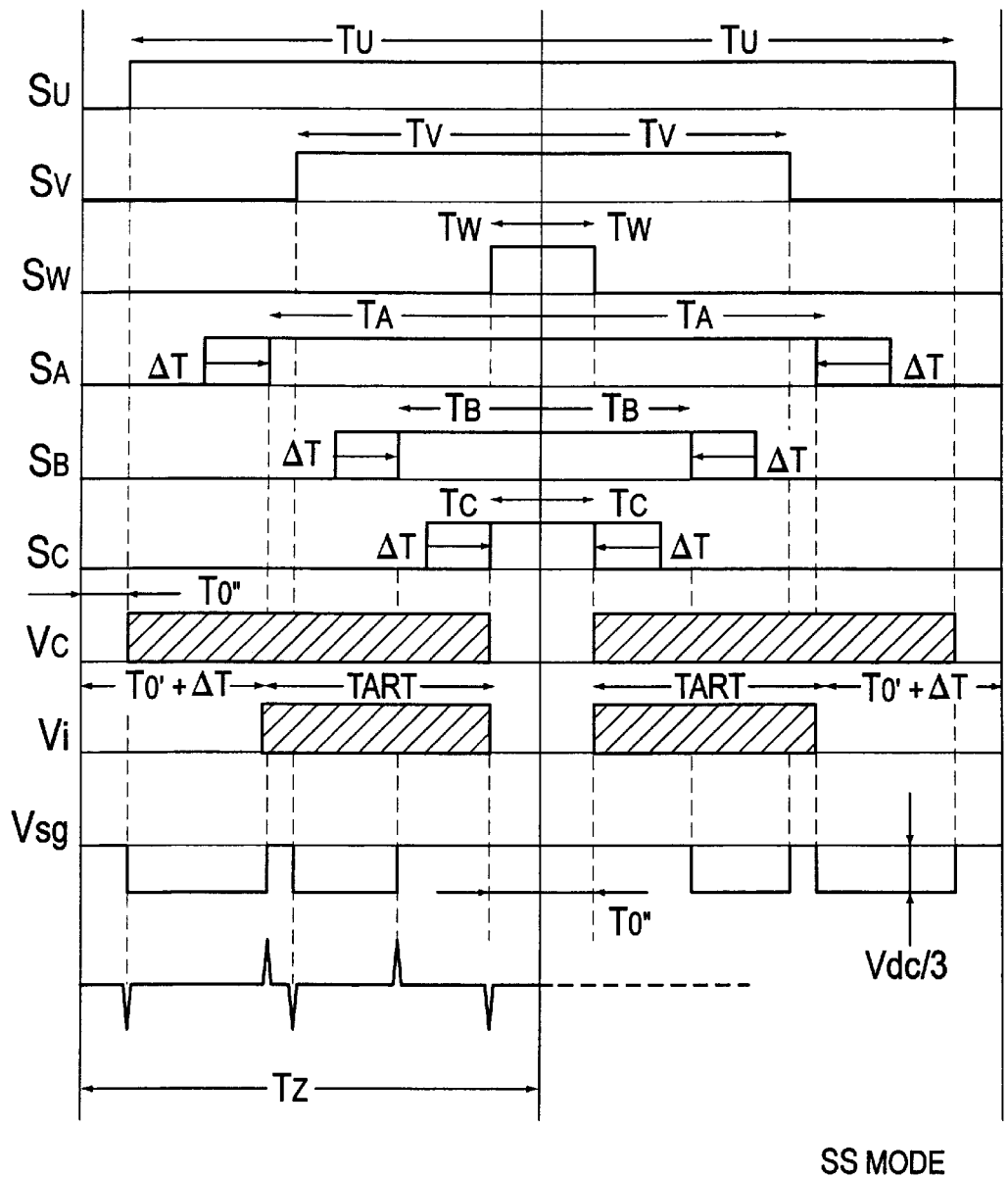
FIG. 5 is a wave-form diagram illustrating an output of each unit when performing a three-phase symmetrical space-vector pulse width modulation in an SS mode according to the first embodiment of the present invention.

With reference to FIGS. 4 and 5, there will be described an operation for varying level change points (turn-on points) of pole voltage commands $S_A, S_B, S_C$ on the basis of the level change points (the turn-on points) of the pole voltage commands $S_U, S_V, S_W$. FIGS. 4 and 5 are wave-form diagrams respectively illustrating an output of each unit when performing a three-phase symmetrical space-vector pulse width modulation according to a first embodiment of the present invention corresponding to FIG. 3, wherein a turn-on point of each of the pole voltage commands $S_U, S_V, S_W$ is identical to that of FIG. 3 and a turn-on point of each of the pole voltage commands $S_A, S_B, S_C$ moves by $\Delta T$.

Particularly, FIG. 4 shows a mode (an LLmode), that accords a change point $T_A$ of the pole voltage command $S_A$ having a longest high level among the pole voltage commands $S_A, S_B, S_C$ of the inverter with a level change point $T_U$ of the pole voltage command $S_U$ having a longest high level among the pole voltage commands $S_U, S_V, S_W$ of the converter during the control cycle Tz. Thus, turn-on points of the pole voltage commands $S_A, S_B, S_C$ of the inverter are respectively advanced compared to the original turn-on points by $\Delta T$, the turn-on point of the pole voltage command $S_A$ becomes identical to the turn-on point of the pole voltage command $S_U$, and the effective voltage of the output voltage vector Vi of the inverter is advanced by $\Delta T$. Thus, the common-mode voltage Vsg varies four times and has four pulses generated during the control cycle Tz.

FIG. 5 shows a mode (an SS mode), that accords a change point $T_C$ of the pole voltage command $S_C$ having a shortest high level among the pole voltage commands $S_A, S_B, S_C$ of the inverter with a level change point $T_w$ of the pole voltage command $S_W$ having a shortest high level among the pole voltage commands $S_U, S_V, S_W$ of the converter during the control cycle Tz. Thus, turn-on points of the pole voltage commands $S_A, S_B, S_C$ of the inverter are respectively delayed to the original turn-on points by $\Delta T$, the turn-on point of the pole voltage command $S_C$ becomes identical to the turn-on point of the pole voltage command $S_W$, and the effective voltage of the output voltage vector Vi of the inverter is delayed by $\Delta T$. Thus, the common-mode voltage Vsg varies four times and has four pulses generated during the control cycle Tz.

In other words, FIG. 4 illustrates that the switching point of the phase which has the longest on-time among the three phases of the inverter accords with the switching point of the phase which has the longest on-time among the three phases of the converter during the control cycle Tz, while FIG. 5 illustrates that the switching point of the phase which has the shortest on-time among the three phases of the inverter accords with the switching point of the phase which the shortest on-time among the three phases of the converter during the control cycle Tz.

While, the time period $\Delta T$ can be obtained by a difference value between an effective voltage application point $T_0''$ of the converter and an effective voltage application point $T_0'$ of the inverter, or by the control cycle Tz and an interval Tact in which the effective voltage of the inverter exists. $\Delta T$ can be obtained as follows.

$$\Delta T = T_0'' - T_0 = T_0'' - (Tz - \text{Tact})/2$$

A ripple element of the phase current of the motor is considered to select a more effective one between the LL and SS modes. When the motor is driven, $I^2_{ripple}$, the square of the ripple element $I_{ripple}$ of the motor phase current is a loss, so that one of the LL and SS modes which produces less $I^2_{ripple}$ of the ripple element will be selected, which is to be later described.

First, a point that has the least ripple element is defined as $T_0\_opt$, a difference value $\delta T_0$ between the point $T_0\_opt$ and the effective voltage application point $T_0'$ of the inverter can be obtained as follows.

$$T'o - To\_opt = \frac{Tz}{Vdc} \cdot \frac{(V_a^* + V_\gamma^*)(2V_a^* + V_\gamma^*)(V_a^* + 2V_\gamma^*)}{4(V_a^{*2} + V_a^* V_\gamma^* + V_\gamma^{*2})} \equiv \delta To$$

wherein, $V_a^*$ and $V_r^*$ are respectively maximum and minimum phase voltage command values of the inverter.

Figure 6B:
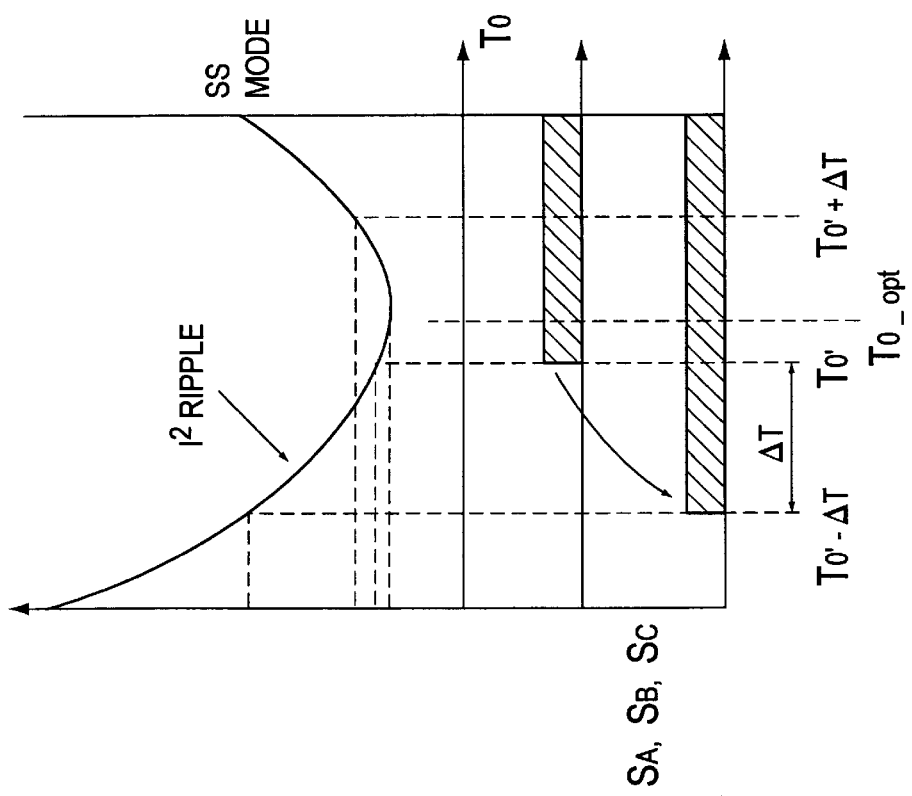
FIGS. 6A and 6B are diagrams illustrating patterns of second pole voltage commands $S_A, S_B, S_C$ to $I^2_{ripple}$, which is the square of a ripple element $I_{ripple}$ of a motor phase current when a motor is driven in accordance with the first embodiment of the present invention.
Figure 6A:
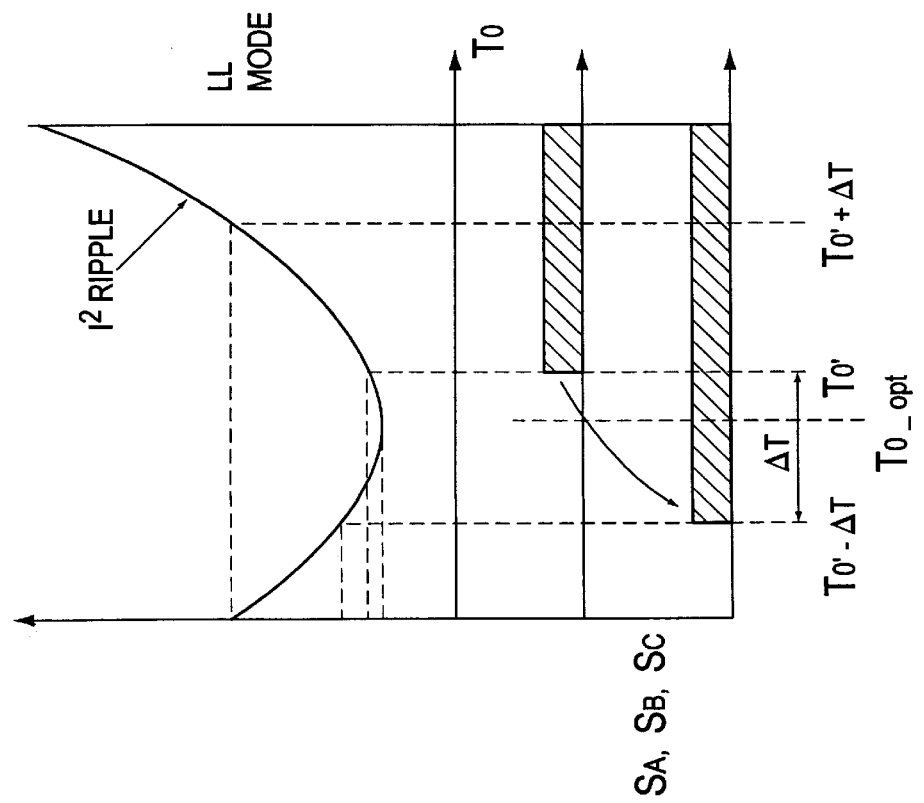

FIGS. 6A and 6B illustrates patterns of second pole voltage commands $S_A, S_B, S_C$ to $I^2_{ripple}$, which is the square of the ripple element $I_{ripple}$ of the motor phase current when the motor is driven. Specifically, FIG. 6A illustrates that $T_0\_opt$ is smaller than $T_0'$ which results in $\delta T_0 > 0$, so that the square of the ripple element at the point $T_0' - \Delta T$ is smaller than the square of the ripple element at the point $T_0' + \Delta T$. Accordingly, the LL mode must be selected, which changes the turn-on point $T_0'$ of the pole voltage command $S_A, S_B, S_C$ to the point $T_0' - \Delta T$. Contrarily, FIG. 6B illustrates that $T_0\_opt$ is greater than $T_0'$ which results in $\delta T_0 < 0$, so that the square of the ripple element at the point $T_0' - \Delta T$ is greater than the square of the ripple element at the point $T_0' + \Delta T$. Accordingly, the SS mode must be selected, which changes the turn-on point $T_0'$ of the pole voltage command $S_A, S_B, S_C$ to the point $T_0' + \Delta T$.

Figure 7:
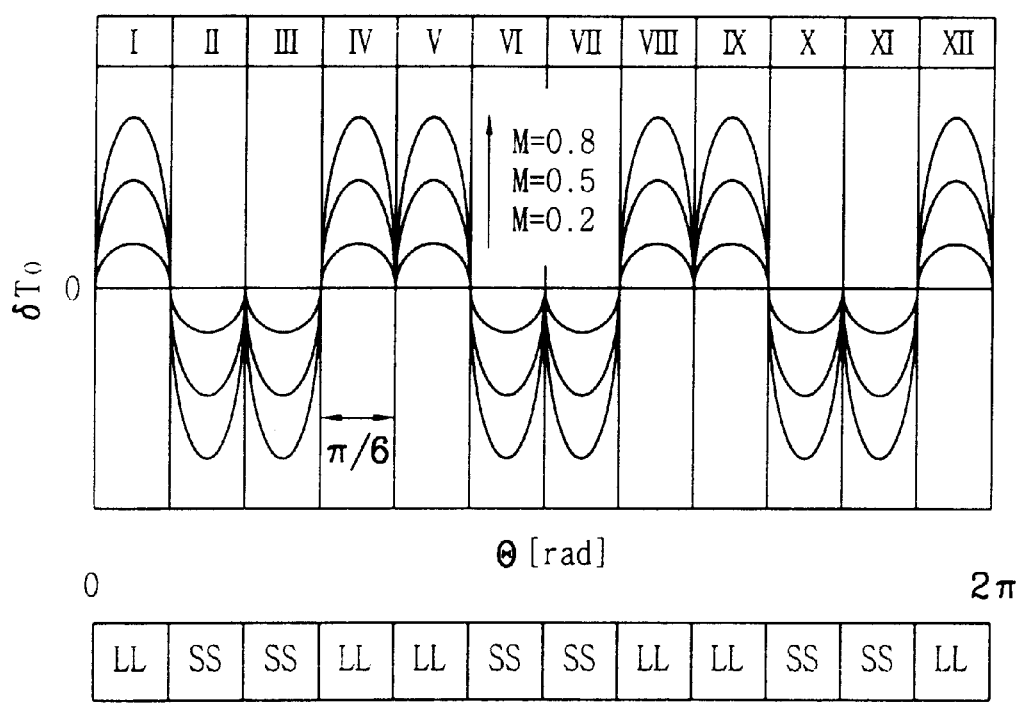
FIG. 7 is a diagram illustrating patterns of a difference value $\delta T_0$ to twelve sectors according to the first embodiment of the present invention.

FIG. 7 illustrates patterns of the difference value $\delta T_0$ to twelve sectors, wherein in the sectors I, IV, V, VIII, IX, and XII since the difference value $\delta T_0$ is greater than 0, the LL mode is selected, while in the sectors II, III, VI, VII, X, XI the difference value $\delta T_0$ is smaller than 0, so that the SS mode is selected.

Figure 1:
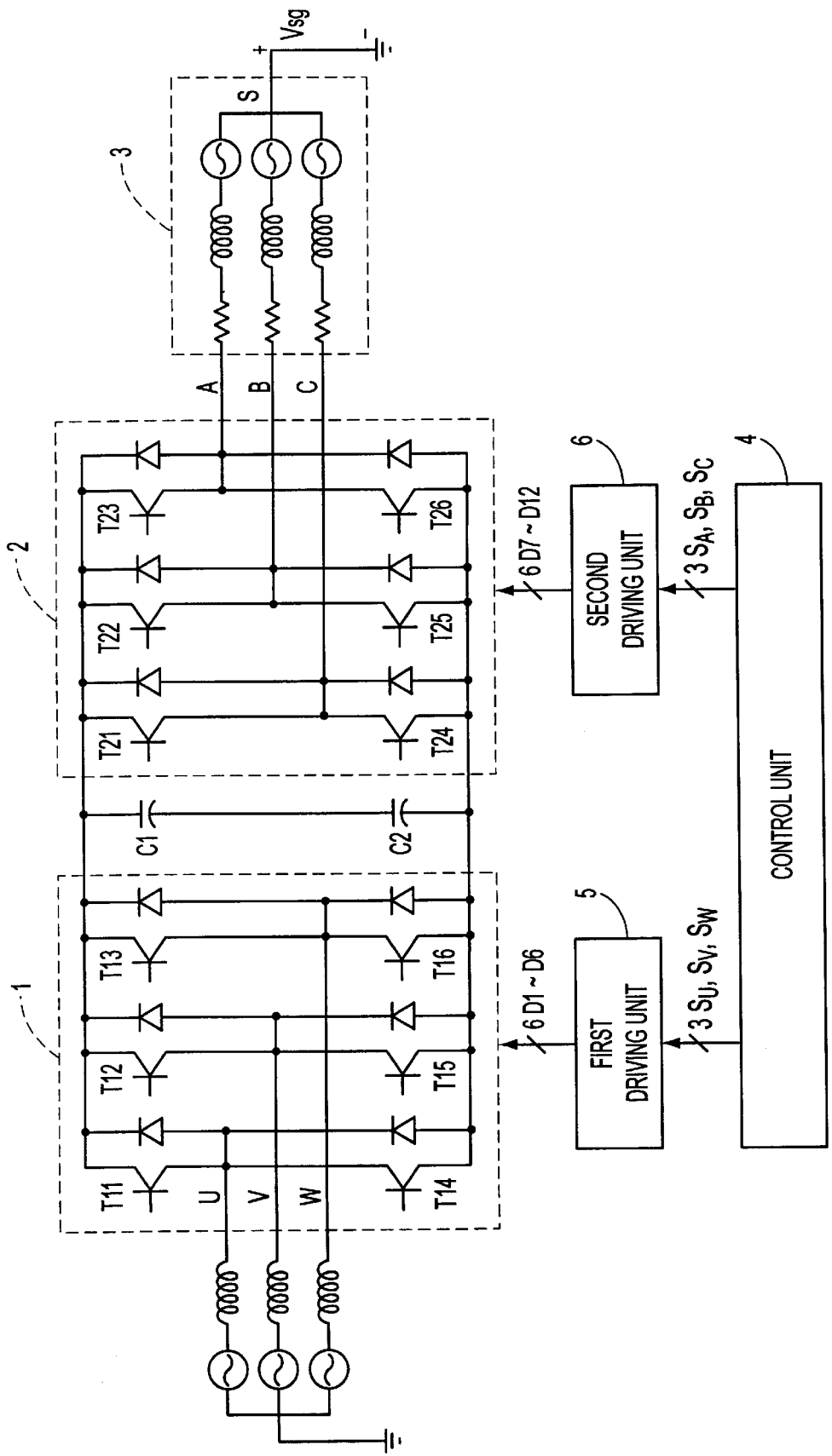
FIG. 1 is a diagram illustrating a conventional three-phase pulse width modulation system for an AC motor.
Figure 2:
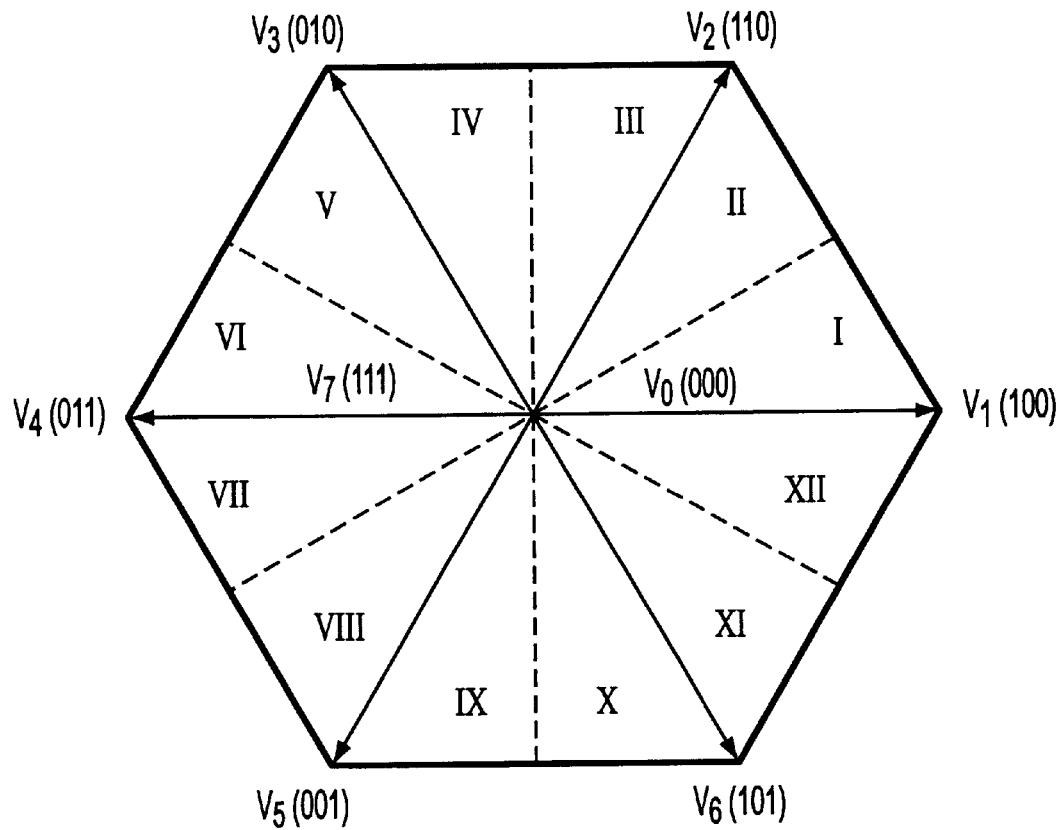
FIG. 2 is diagram illustrating output voltage vectors of a converter and an inverter in the conventional art.

A schematic configuration of the three-phase pulse width modulation system for the AC motor according to the present invention is similar to that of FIG. 1. However, the control unit 4 of the three-phase pulse width modulation system for the AC motor of the present invention includes a memory that stores information for performing the three-phase pulse width modulation method in accordance with each sector. Further, as shown in FIG. 7, in the memory there are stored a plurality of sectors, information of the pulse width modulation method (the LL or SS mode) with respect to each of the sectors.

Figure 8:
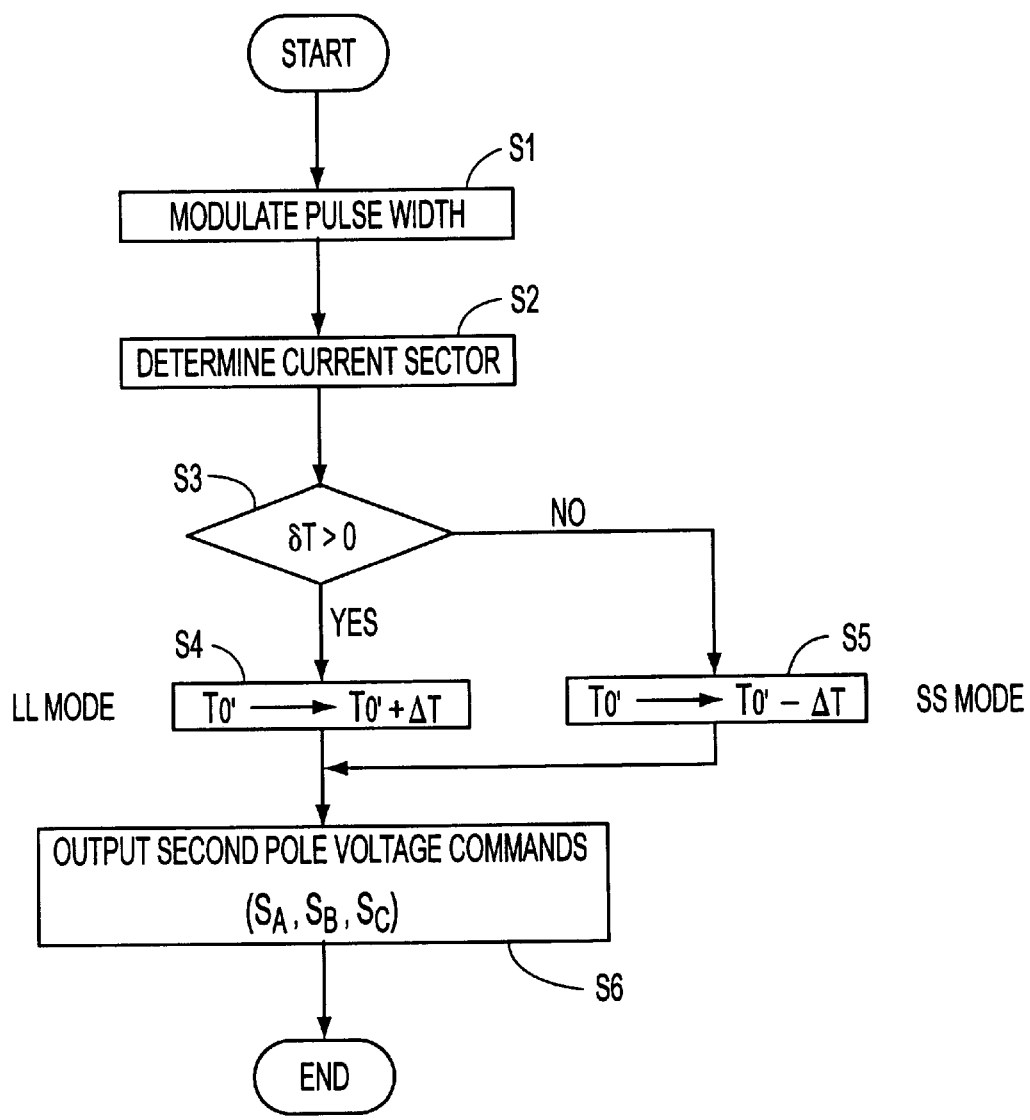
FIG. 8 is a flowchart illustrating a three-phase pulse width modulation method according to the first embodiment of the present invention.

FIG. 8 is a flowchart illustrating the three-phase pulse width modulation according to the first embodiment of the present invention.

When pulse width modulation is processed in an initial state (S1), the control unit 4 determines a current sector on the basis of the information of the output voltage vector Vc of the converter and the output voltage vector Vi of the inverter (S2), and judges whether or not the difference value $\delta T_0$ corresponding to the determined sector is greater than 0 (S3). When the difference value $\delta T_0$ is greater than 0, the control unit 4 selects the LL mode that advances the turn-on points of the second pole voltage commands $S_A, S_B, S_C$ by $\Delta T$ compared with the original turn-on points (S4), and if the difference value $\delta T_0$ is smaller than 0, the control unit 4 selects the SS mode that delays the turn-on points of the second pole voltage commands $S_A, S_B, S_C$ by $\Delta T$ compared with the original turn-on points (S5). Next, the control unit 4 outputs the second pole voltage commands $S_A, S_B, S_C$, of which the turn-on points have been changed in accordance with the selected pulse width modulation, to the second driving unit 6 (S6), whereby each of the switching points of the switching transistors T21–T26 of the inverter 2 becomes slower or faster than the original turn-on point by $\Delta T$.

As for a second embodiment of the present invention, a three-phase pulse width modulation is employed to reduce a common-mode voltage which is $\pm 2Vdc/3$, while the three-phase pulse width modulation according to the first embodiment of the present invention is to reduce the common-mode voltage which is $\pm Vdc/3$. Here, in the second embodiment of the present invention the case where the common-mode voltage is $\pm Vdc$ is not considered, because the common-mode voltage which is $\pm Vdc$ can not be generated since switching frequencies of the converter and the inverter are identical to each other and control cycles thereof are synchronized with each other.

The common-mode voltage a size of which is $\pm 2Vdc/3$ considerably affects the bearing current flowing in a motor bearing and the shaft voltage between the shaft and the ground. The bearing current flowing to the ground via the motor case is generated by the dielectric breakdown of bearing lubricant when the shaft voltage of the motor is higher than the dielectric breakdown voltage, and the generation of the bearing current is related to the size of the shaft voltage which exists in a capacitor voltage divided type of the common-mode voltage. Accordingly, to reduce the probability of the bearing current generation and the shaft voltage, it is important to reduce the size of the common-mode voltage of $\pm 2Vdc/3$.

Figure 10:
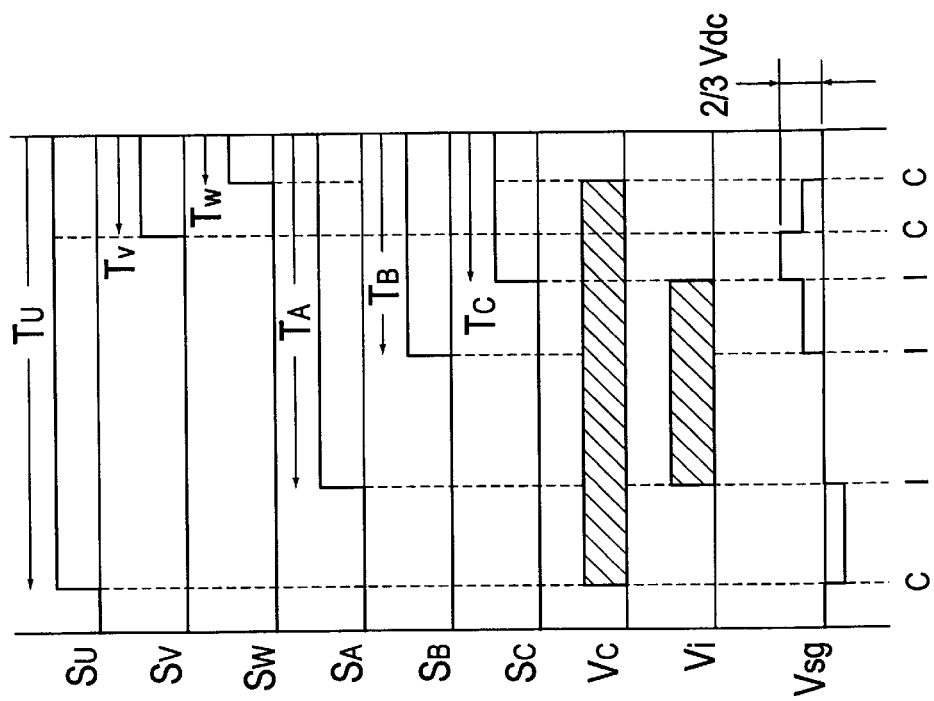
FIG. 10 is a wave-form diagram illustrating an output of each unit in accordance with a switching pattern C-I-I-I-C-C before the three-phase symmetrical space-vector pulse width modulation according to the second embodiment of the present invention.
Figure 9:
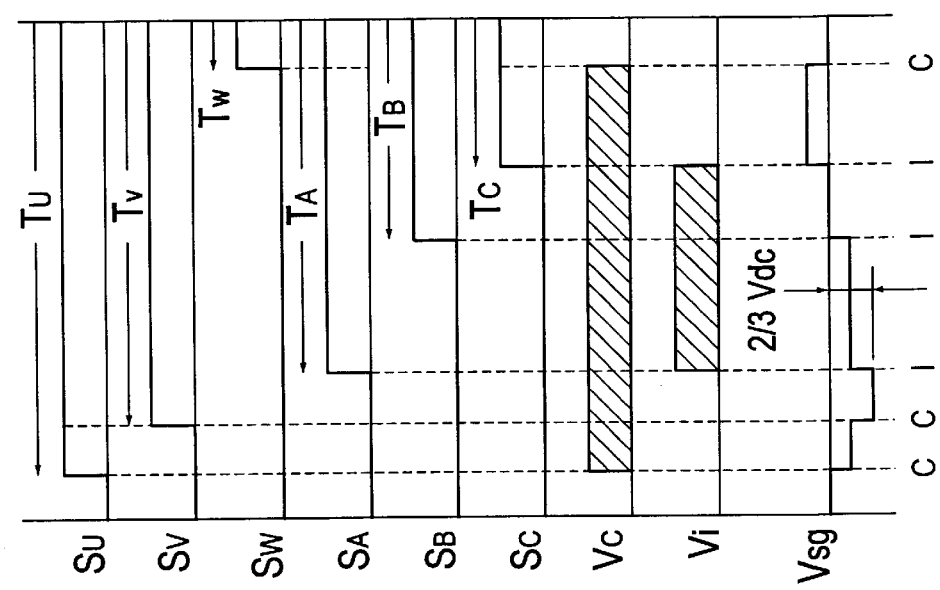
FIG. 9 is a wave-form diagram illustrating an output of each unit in accordance with a switching pattern C-C-I-I-I-C before the three-phase symmetrical space-vector pulse width modulation according to a second embodiment of the present invention.

As shown in the above table, the common-mode voltage of $\pm 2Vdc/3$ can be generated by the combination of the vector $V_0$ and the vectors V2, V4, V6 and the combination of the vector 7 and the vectors V1, V3, V5. FIG. 9 illustrates a pattern of the common-mode voltage Vsg when the output voltage vectors of the inverter are V2,V4,V6 and the output voltage vector of the converter Vc is V0, wherein the common-mode voltage Vsg the size of which is $-2Vdc/3$ is generated between the turn-on point of the pole voltage command $S_V$ an the turn-on point of the pole voltage command $S_A$. FIG. 10 illustrates a pattern of the common-mode voltage Vsg when the output voltage vectors of the inverter are V1, V3, V5 and the output voltage vector of the converter Vc is V7, wherein the common-mode voltage Vsg the size of which is $+2Vdc/3$ is generated between the turn-on point of the pole voltage command $S_C$ an the turn-on point of the pole voltage command $S_V$. For the convenience of explanation, the switching patterns of FIGS. 9 and 10 are expressed in C-C-I-I-I-C and C-I-I-I-C-C, respectively, wherein 'C' indicates the converter switching and 'I' indicates the inverter switching.

Figure 11:
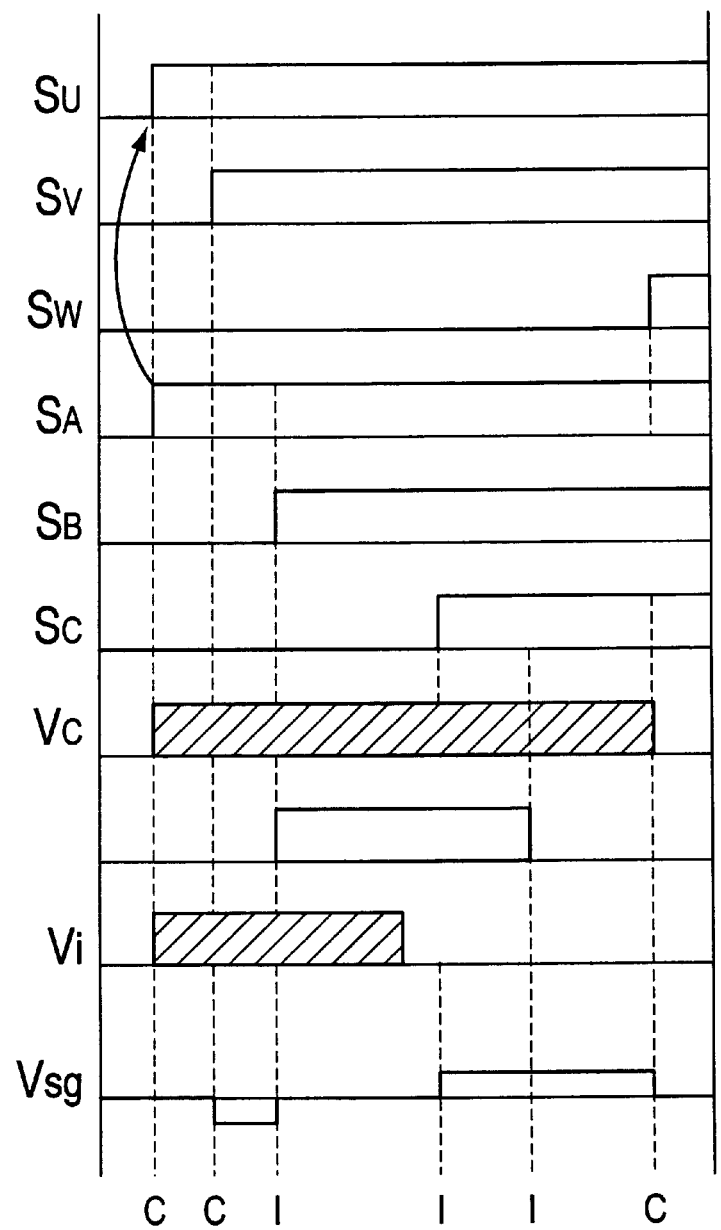
FIGS. 11 through 13 are wave-form diagrams illustrating each unit in accordance with a switching pattern C-C-I-I-I-C in LL, SS and LM modes, respectively, according to the second embodiment of the present invention.
Figure 12:
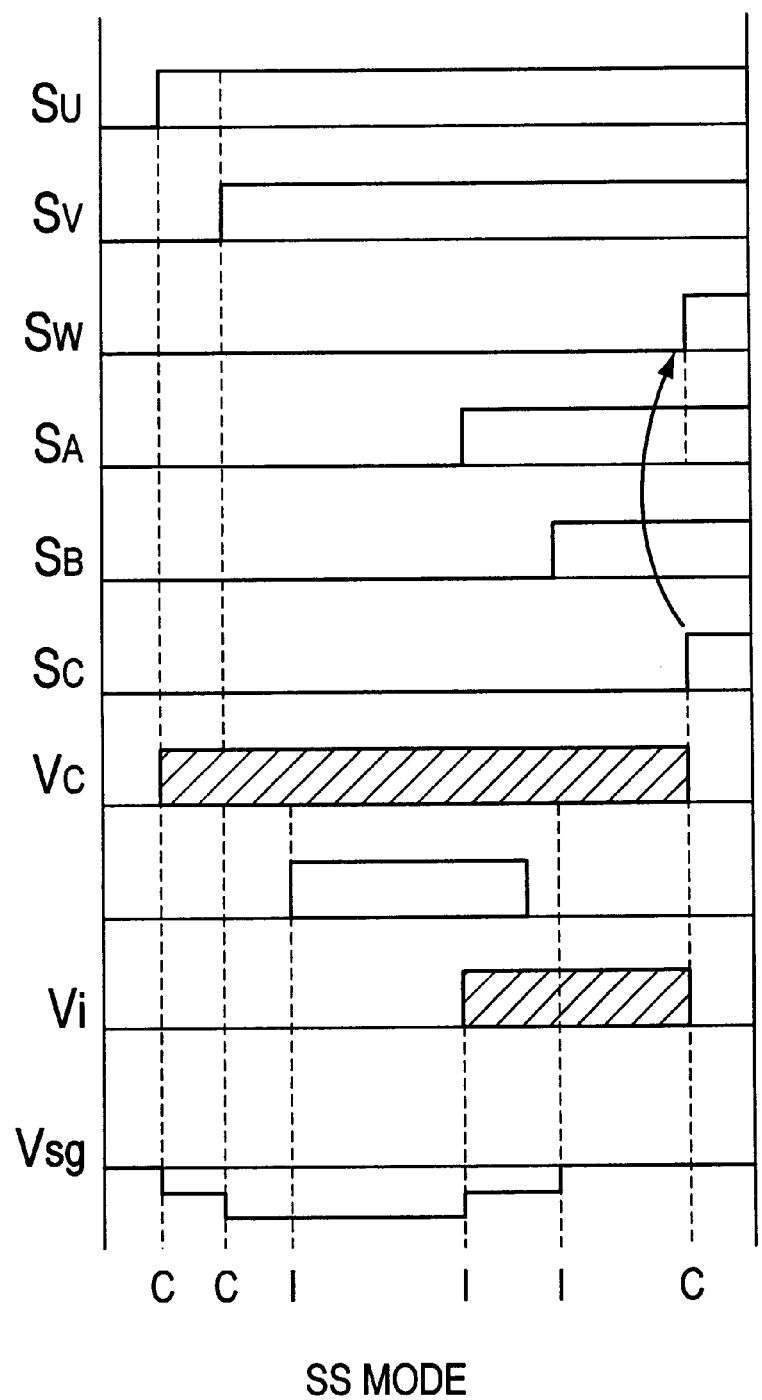
Figure 13:
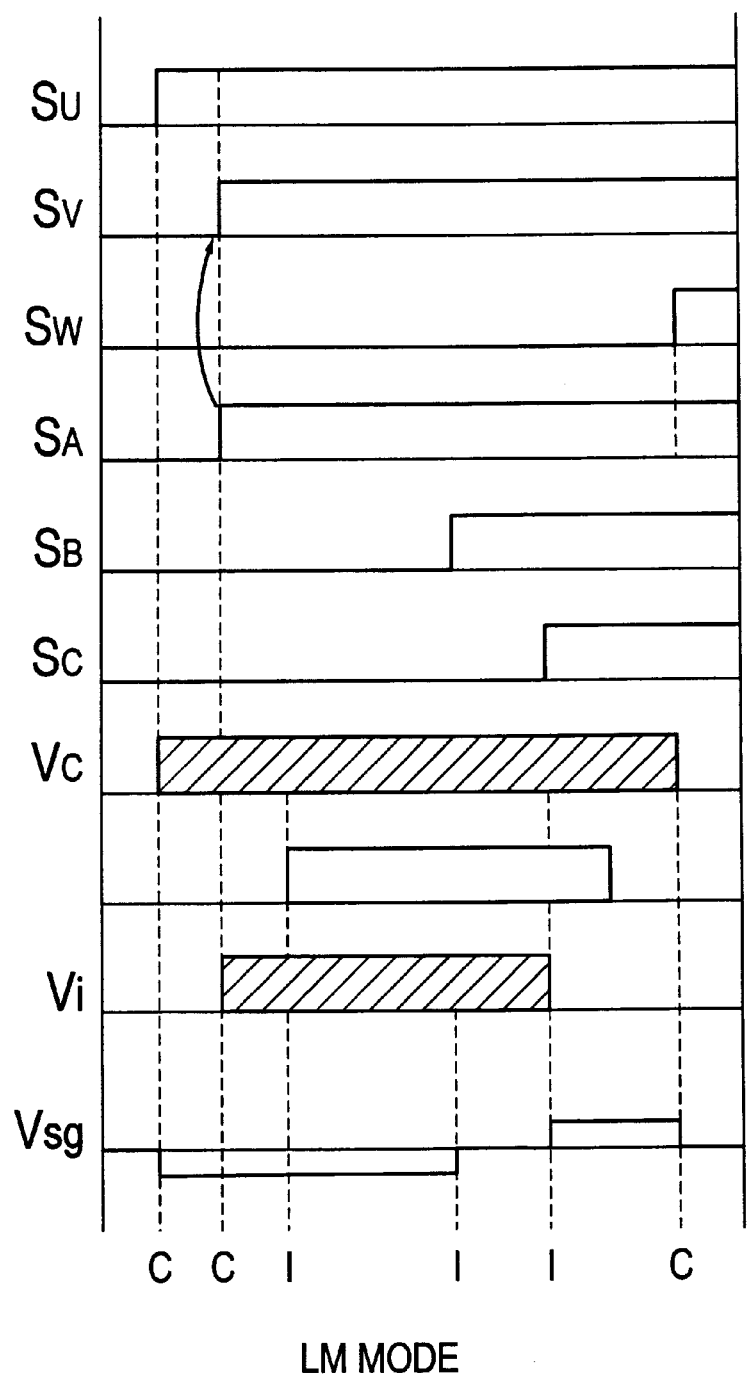

FIGS. 11 through 13 illustrate patterns of the common-mode voltage Vsg in C-C-I-I-I-C when the turn-on points of the pole voltage commands $S_A, S_B, S_C$ are changed. Specifically, FIGS. 11 and 12 are wave-form diagrams illustrating each unit when employing the LL and SS modes, respectively. While, FIG. 13 applies a mode (hereinafter, called an LM mode) that accords a change point of the pole voltage command $S_A$ having the longest high level among the pole voltage commands $S_A, S_B, S_C$ of the inverter with a level change point of the pole voltage command $S_V$ having a medium high level period among the pole voltage commands $S_U, S_V, S_W$ of the converter.

As shown in FIG. 12, although the number of pulses of the common-mode voltage is reduced to four from six pulses by the SS mode, it can not be used since the common-mode voltage Vsg of $-2Vdc/3$ does not reduce. However, the common-mode voltage Vsg in accordance with the LL and LM modes of FIGS. 11 and 13, respectively, is reduced from $-2Vdc/3$ to $-Vdc/3$, so that it can be effectively used. As a result of the tests with the LL and LM modes, when the rotation number of the motor 3 is less than 1000 rpm, the LM mode has a better effect than the LL mode. Accordingly, in the second embodiment of the present invention, when the switching pattern is C-C-I-I-I-C, the LM mode is employed to eliminate the common-mode voltage Vsg of $-2Vdc/3$.

Figure 14:
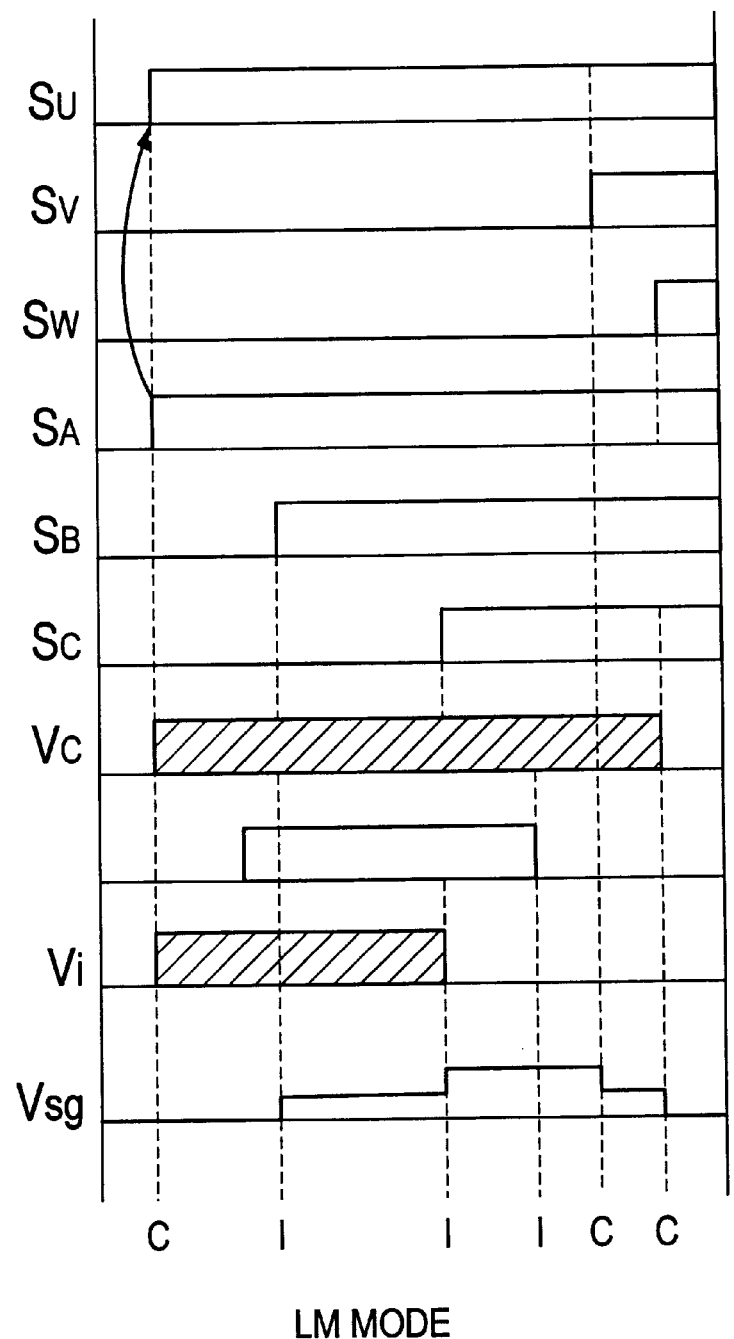
FIGS. 14 through 16 are wave-form diagrams illustrating each unit in accordance with a switching pattern C-I-I-I-C-C in LL, SS and SM modes, respectively, according to the second embodiment of the present invention.
Figure 15:
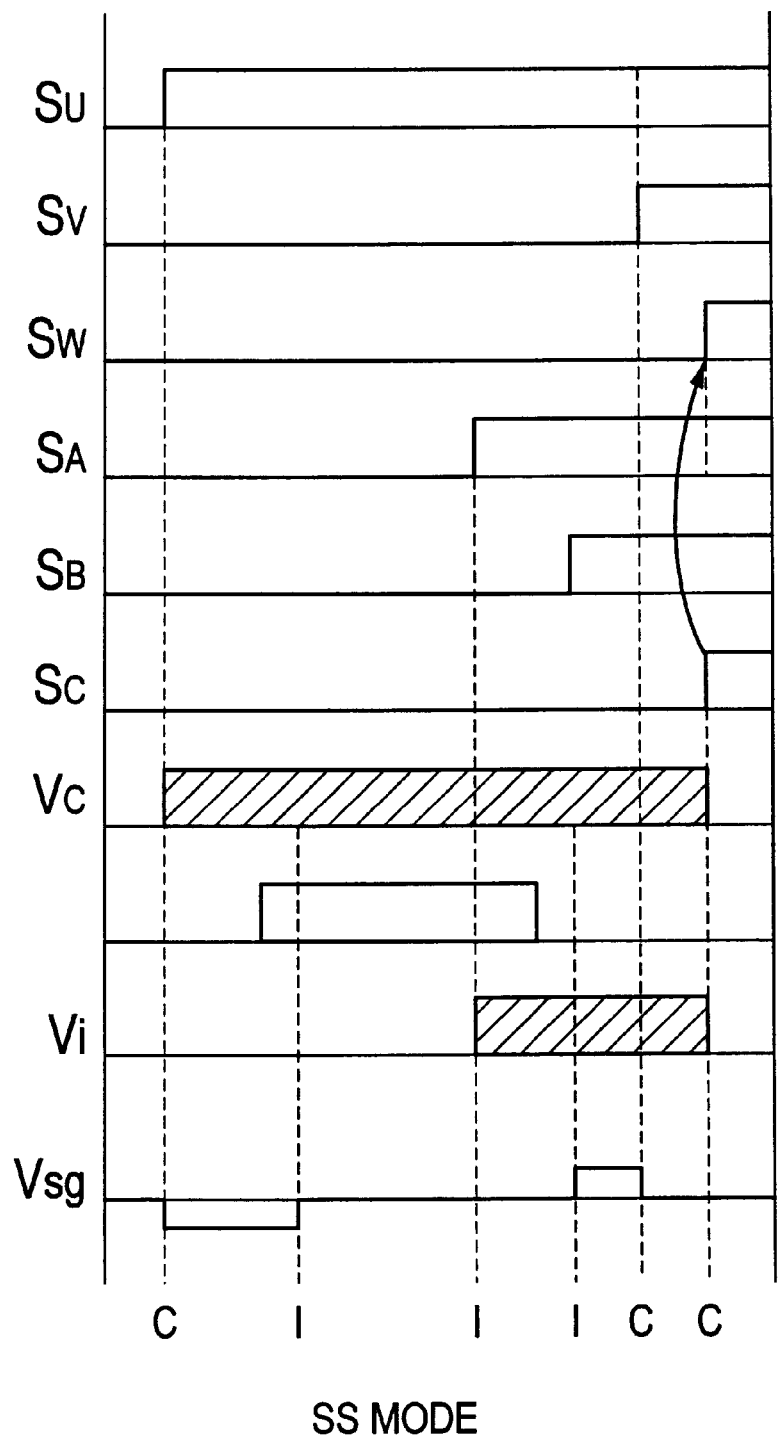
Figure 16:
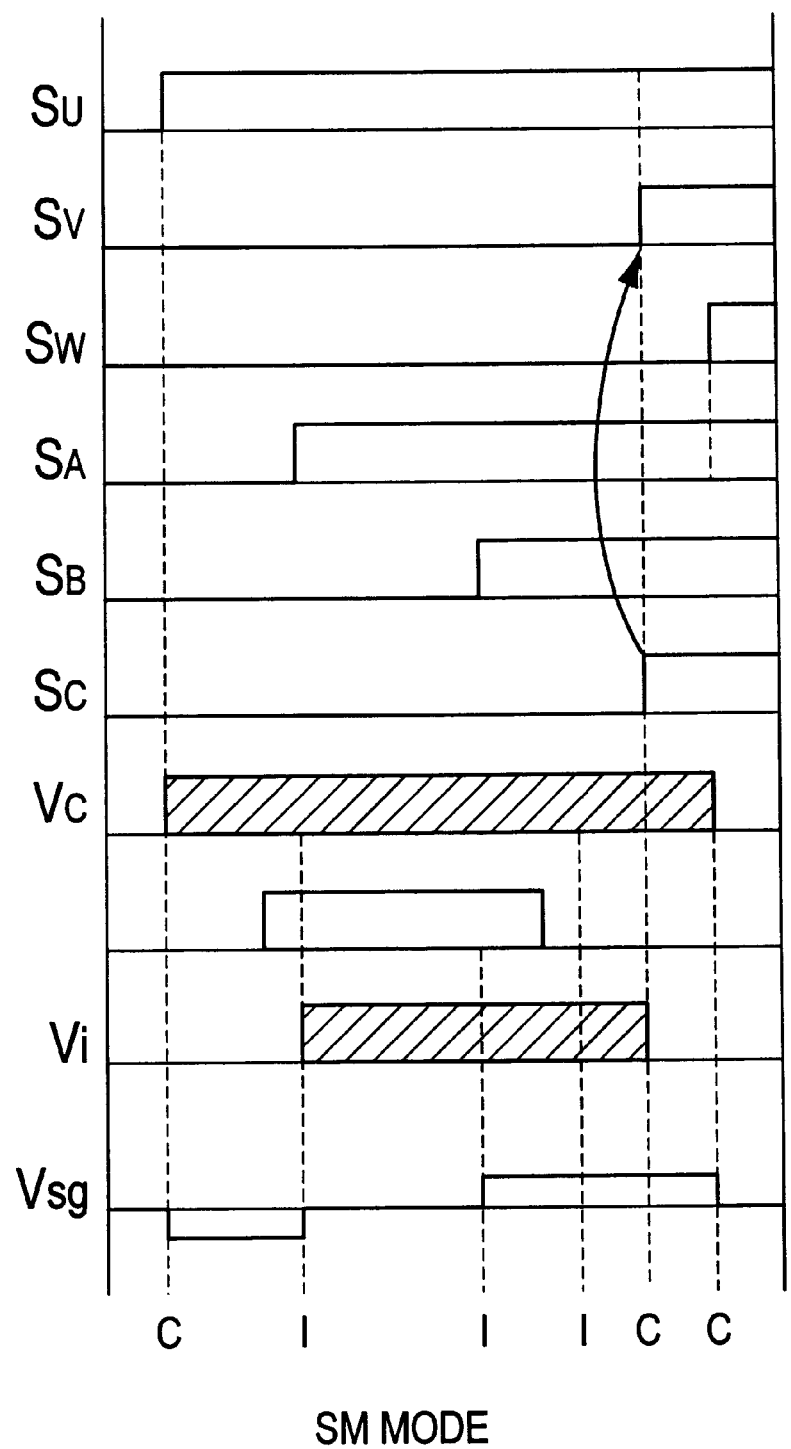

FIGS. 14 through 16 illustrate patterns of the common-mode voltage Vsg in C-I-I-I-C-C when the turn-on points of the pole voltage commands $S_A$, SB, $S_C$ are changed. Specifically, FIGS. 14 and 15 are wave-form diagrams illustrating each unit when employing the LL and SS modes, respectively. While, FIG. 16 applies a mode (hereinafter, called an SM mode) that accords a change point of the pole voltage command $S_C$ having the shortest high level among the pole voltage commands $S_A, S_B, S_C$ of the inverter with the level change point of the pole voltage command $S_V$ having the medium high level period among the pole voltage commands $S_U, S_V, S_W$ of the converter.

As shown in FIG. 14, although the number of pulses of the common-mode voltage is reduced to four from six pulses by the LL mode, it can not be used since the common-mode voltage Vsg of $-2Vdc/3$ does not reduce. However, the common-mode voltage Vsg in accordance with the SS and SM modes of FIGS. 15 and 16, respectively, is reduced from $+2Vdc/3$ to $+Vdc/3$, so that it can be effectively used. As a result of the tests with the SS and SM modes, when the rotation number of the motor 3 is less than 1000 rpm, the SM mode has a better effect than the SS mode. Accordingly, in the second embodiment of the present invention, when the switching pattern is C-I-I-I-C-C, the SM mode is employed to eliminate the common-mode voltage Vsg of $+2Vdc/3$.

Figure 17:
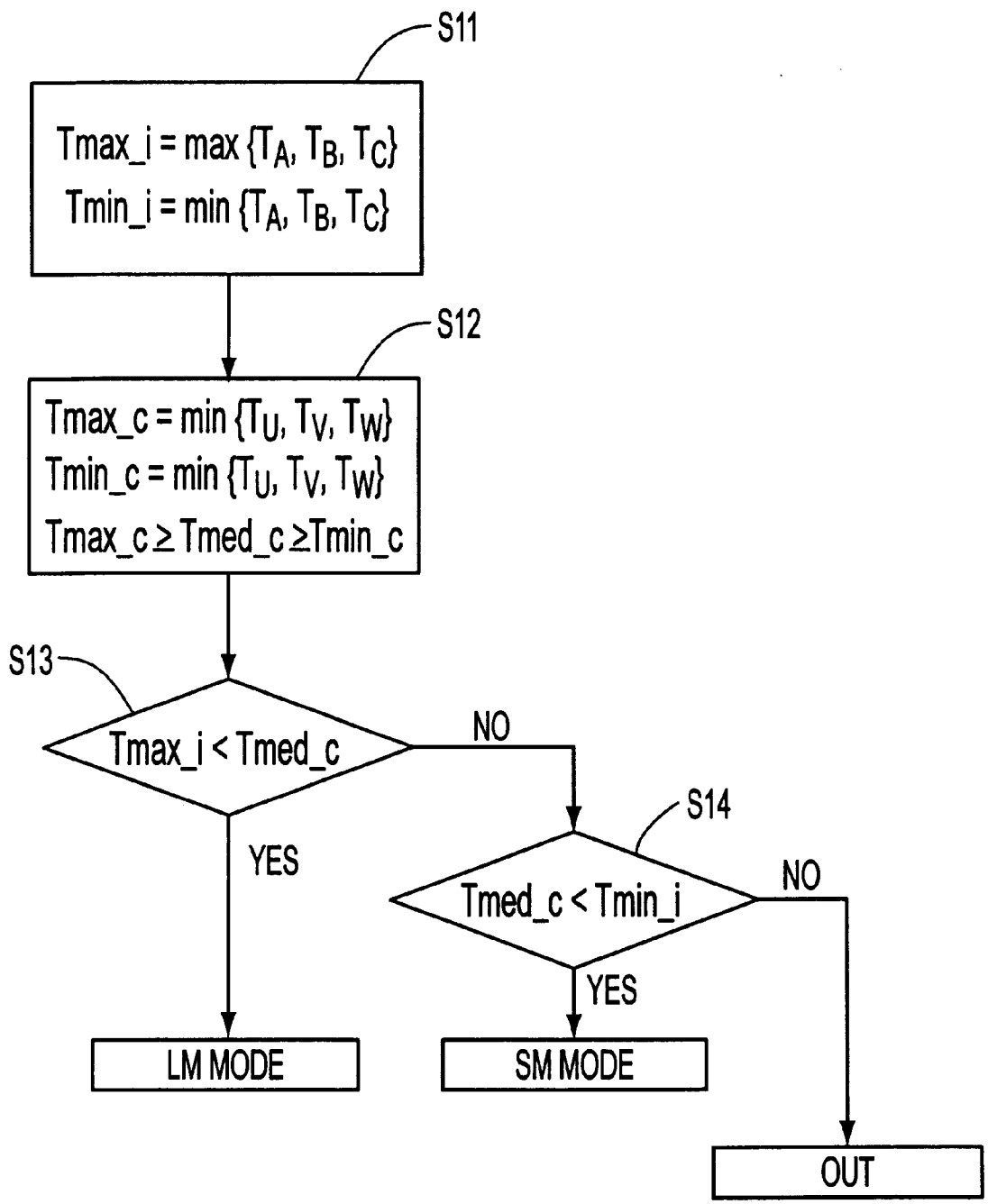
FIG. 17 is a flowchart illustrating a three-phase pulse width modulation method according to the second embodiment of the present invention.

FIG. 17 is a flowchart illustrating a method of determining whether the switching pattern is C-C-I-I-I-C or C-I-I-I-C-C when the common-mode voltage Vsg is $+2Vdc/3$ in the three-phase pulse width modulation according to the second embodiment of the present invention. The determination can be made by comparing on-times $T_U, T_V, T_W$ of the first pole voltage commands $S_U$, $S_V$, $S_W$ with on-times $T_A, T_B, T_C$ of the second pole voltage commands $S_A, S_B, S_C$, which will be later described in more detail. In FIG. 17, the on-times $T_U, T_V, T_W$ of the first pole voltage commands $S_U$, $S_V$, $S_W$ respectively indicate a switching interval of each phase of the converter and the on-times $T_A, T_B, T_C$ of the second pole voltage commands $S_A, S_B, S_C$ respectively indicate a switching interval of each phase of the inverter. The operation according to FIG. 17 is processed between the step S1 and the step S2 of FIG. 8.

Specifically, when the pulse width modulation is performed in the initial state (S1 of FIG. 8), the control unit 4 determines a longest on-time among $T_A, T_B, T_C$ of the second pole voltage commands $S_A, S_B, S_C$ as a maximum on-time Tmax_i and determines a shortest on-time as a minimum on-time Tmin_i (S11), and then the control unit 4 determines a medium on-time period among $T_U, T_V, T_W$ of the first pole voltage commands $S_U, S_V, S_W$ as a medium on-time Tmed_c (C12). If the maximum on-time Tmax_i is smaller than medium on-time Tmed_c, the control unit 4 determines the current switching pattern as C-C-I-I-I-C (S13). Contrary, if the maximum on-time Tmax_i is greater than medium on-time Tmed_c, the control unit 4 determines the current switching pattern as C-I-I-I-C-C (S14). In accordance with the result of the determination, the control unit 4 changes the turn-on times of the second pole voltage commands $S_A, S_B, S_C$ and outputs the changed turn-on times thereof.

As described above, the three-phase pulse width modulation method and system for the AC motor according to the present invention reduces the common-mode voltage by changing the switching of the inverter in consideration of the switching of the converter with no modification of the size of the effective voltage of the inverter, thereby stably controlling the motor.

It will be apparent to those skilled in the art that various modifications and variations can be made in the three-phase pulse width modulation method and system for the AC motor of the present invention without departing from the spirit or scope of the invention. Thus, it is intended that the present invention cover the modifications and variations of this invention provided they come within the scope of the appended claims and their equivalents.

What is claimed is:

1. A method of modulating a three-phase pulse width of a three-phase pulse width modulating system for an alternating current AC motor, the three-phase pulse width modulating system including an inverter and a converter, the three-phase pulse width modulation method, comprising the following steps:

(a) determining a current switching pattern of the converter; and (b) changing switching points of three phases of the inverter so that a switching point of a phase among the three phases of the converter accords with a switching point of a phase among the three phases of the inverter in accordance with the determined switching pattern.

2. The method according to claim 1, wherein step (a) determines the switching pattern on the basis of a size of the square of a ripple element of upper currents.

3. The method according to claim 2, wherein step (b) accords a switching point of a phase among the three phases of the inverter having a longest on-time with a switching point of a phase among the three phases of the converter having a longest on-time, or accords a switching point of a phase among the three phases of the inverter having a shortest on-time with a switching point of a phase among the three phases of the converter having a shortest on-time.

4. The method according to claim 1, wherein step (a) compares a switching interval of each phase of the inverter to a switching interval of each phase of the converter.

5. The method according to claim 4, wherein step (b) accords a switching point of a phase among the three phases of the converter having a medium on-time with a switching point of a phase among the three phases of the inverter having a longest on-time or a shortest on-time.

6. The method according to claim 1, wherein step (a) determines a current switching pattern as C-C-I-I-I-C when a phase of the converter having a medium switching interval among the three phases is longer than a phase of the inverter having a longest switching interval, and determines a current switching pattern as C-I-I-I-C-C when the phase of the converter having the medium switching interval among the three phases is shorter than a phase of the inverter having a shortest switching interval, wherein 'C' indicates a converter switching and 'I' indicates an inverter switching.

7. The method according to claim 6, wherein step (b) accords the switching point of the phase among the three phases of the converter having the medium on-time with the switching point of the phase among the three phases of the inverter having the longest on-time when the current switching pattern is C-C-I-I-I-C, and accords the switching point of the phase among the three phases of the converter having the medium on-time with the switching point of the phase among the three phases of the inverter having the shortest on-time when the current switching pattern is C-I-I-I-C-C.

8. The method according to claim 7, wherein step (a) again determines the switching pattern on the basis of the size of the square of the ripple element of the upper currents in the motor when the current switching pattern is neither C-C-I-I-I-C nor C-I-I-I-C-C and then, in accordance with the determined switching pattern, accords a switching point of a phase among the three phases of the inverter having a longest on-time with a switching point of a phase among the three phases of the converter having a longest on-time, or accords a switching point of a phase among the three phases of the inverter having a shortest on-time with a switching point of a phase among the three phases of the converter having a shortest on-time.

9. A system which includes an inverter and a converter for modulating a three-phase pulse width of an AC motor, the system, comprising:

a control unit for outputting three first pole voltage commands and three second pole voltage commands;

a first driving unit for outputting a first driving signal to the converter in accordance with the three first pole voltage commands; and a second driving unit for outputting a second driving signal to the inverter in accordance with the three second pole voltage commands, wherein the control unit compares a switching interval of each phase of the inverter to a switching interval of each phase of the converter, for thereby according an on-time of one of the three second pole voltage commands with an on-time of one of the three first pole voltage commands.

10. A system which includes an inverter and a converter for modulating a three-phase pulse width of an AC motor, the system, comprising:

a control unit for outputting three first pole voltage commands and three second pole voltage commands;

a first driving unit for outputting a first driving signal to the converter in accordance with the three first pole voltage commands; and a second driving unit for outputting a second driving signal to the inverter in accordance with the three second pole voltage commands, wherein the control unit determines a current sector by combining output voltage vectors of the converter and output voltage vectors of the inverter, for thereby according an on-time of one of the three second pole voltage commands with an on-time of one of the three first pole voltage commands in accordance with the determined sector.

11. The system according to claim 10, wherein the control unit includes a memory storing information for performing three-phase pulse width modulation in accordance with each sector, the memory storing the information of pulse width modulation with respect to a plurality of sectors and each thereof in a table type.

* * * * *